United States Patent [19]

Castelain et al.

[11] Patent Number: 5,307,376
[45] Date of Patent: Apr. 26, 1994

[54] DEVICE FOR THE COHERENT DEMODULATION OF TIME-FREQUENCY INTERLACED DIGITAL DATA, WITH ESTIMATION OF THE FREQUENCY RESPONSE OF THE TRANSMISSION CHANNEL AND THRESHOLD, AND CORRESPONSING TRANSMITTER

[75] Inventors: M. Damien Castelain; M. Jean-Francois Helard; M. Bernard Le Floch; M. Jean-Christophe Rault, all of Rennes, France

[73] Assignee: France Telecom, France

[21] Appl. No.: 820,484

[22] Filed: Jan. 14, 1992

[30] Foreign Application Priority Data

Jan. 17, 1991 [FR] France .................. 91 00654

[51] Int. Cl.$^5$ .................. H04K 1/10; H04L 27/28
[52] U.S. Cl. .................. 375/38; 375/59; 375/94; 370/20
[58] Field of Search .................. 375/38, 39, 57, 58, 375/94, 95, 59; 370/19, 20, 110.1

[56] References Cited

U.S. PATENT DOCUMENTS

| | | | |
|---|---|---|---|
| 4,731,816 | 3/1988 | Hughes-Hartogs | 375/58 X |
| 4,802,109 | 1/1989 | Machida | 364/723 |
| 4,881,241 | 11/1989 | Pommier et al. | 375/38 |

OTHER PUBLICATIONS

M. Alard and R. Lassalle, Principles of modulation and channel coding for mobile receivers, EBU Review--Technical; Aug. 1987, pp. 168-189.
Robert C. DiPietro, An FFT Based Technique for Suppressing Narrow-Band Interference in PN Spread Spectrum Communications Systems, IEEE 1989, 19891 pp. 1360-1363.
Aiichiro Tsuzuku and Yoshihiko Ishikawa, Mobile Teletext Reception Using Signal Processing in Frequency Domain, IEEE 1989; pp. 0422-0425.
Schaller, "Verwendung der schnellen Fouriertransformation in digitalen Filtern", (Nachrichtentechnische Zeitschrift, vol. 27, No. 11, Nov. 1974, pp. 425-431.

*Primary Examiner*—Stephen Chin
*Assistant Examiner*—Tesfaldet Bocure
*Attorney, Agent, or Firm*—Locke Reynolds

[57] ABSTRACT

A method and apparatus for the coherent demodulation of a digital signal constituted by digital elements distributed in the time-frequency space and transmitted in the form of symbols constituted by a multiplex of N orthogonal carrier frequencies modulated by a set of said digital elements and broadcast simultaneously, the digital signal also including reference elements having a known value position in said time frequency space. The method includes a Fourier transform of at least samples of said digital signal containing said reference elements from a frequency domain into a temporal domain, a weighting of the transformed samples in the temporal domain by a rectangular temporal window $f_n$, a thresholding of the transformed samples in the temporal domain to eliminate any samples below a predetermined threshold, and a reverse Fourier transform of the samples remaining after said weighting and thresholding from the temporal domain into the frequency domain for projection onto said digital signal. The threshold level can be fixed or varied based on the power level of the noise affecting the transmission channel or an estimated pulse response of the transmission channel.

18 Claims, 5 Drawing Sheets

DEVICE FOR THE COHERENT DEMODULATION OF TIME-FREQUENCY INTERLACED DIGITAL DATA, WITH ESTIMATION OF THE FREQUENCY RESPONSE OF THE TRANSMISSION CHANNEL AND THRESHOLD, AND CORRESPONSING TRANSMITTER

BACKGROUND OF THE INVENTION

1. Field of the Invention

The field of the invention is that of the broadcasting of digital data intended to be received notably by mobile receivers moving about in an urban environment, i.e. under conditions of multiple propagation (Rayleigh Process) generating phenomena of fading, and in the presence of parasites and jamming. More generally, the invention relates to the broadcasting of digital signals in channels assigned multiple paths, the characteristics of which vary in time.

The invention can be applied more particularly, but not exclusively, to the system of digital sound broadcasting known as the COFDM (Coding Orthogonal Frequency Division Multiplex), as described in the U.S. Pat. No. 4,881,241 of Nov. 14, 1990.

This system of digital broadcasting is based on the combined use of a channel coding device and a method of modulation by orthogonal frequency division multiplexing.

2. Description of the Prior Art

The modulation method proper of this prior art system can be used to resolve the problems related to the frequency selectivity of the channel. It consists in providing for the distribution of the constituent digital elements of the data signal in the frequency time space f-t, and in simultaneously transmitting sets of digital elements on a plurality of parallel broadcasting channels by means of a multiplex of frequencies using orthogonal carriers. In particular, this type of modulation makes it possible to prevent two successive elements of the data train from being transmitted at the same frequency.

The known encoding method seeks, on the whole, to enable the processing of the samples coming from the demodulator to absorb the effect of variations in amplitude of the received signal, due to the Rayleigh process. The encoding is advantageously a convolutive encoding, possibly concatenated with a Reed-Solomon type of encoding. The decoding may be advantageously a soft decision type of iterbi decoding.

In a known way, the encoded digital elements are furthermore interlaced (interleaved), in time and in frequency, so as to maximize the statistical independence of the channels with regard to the Rayleigh process and to the selective character of the channel.

The demodulation of the received signal may be differential or coherent.

The value of differential demodulation lies essentially in the simplicity of its implementation and in its absence of inertia after a deep fading. It is this approach that has been used to validate the general principles of the COFDM system.

In theory, coherent demodulation offers greater resistance to noise than differential demodulation, making it possible to obtain a gain in performance of about 3 dB. However, it can be clearly seen that, under the reception conditions specific to systems of broadcasting towards moving receivers in a disturbed environment, it is particularly difficult to extract a phase and amplitude reference from the modulation signal for each carrier of the multiplex. In the case of coherent demodulation, the error made in the estimation of the carrier therefore leads to a substantial deterioration in performance characteristics. This is especially true in the case of deep and fast fading encountered when the carrier frequency or the speed of the vehicle increases.

In other words, coherent demodulation, in principle, performs better than differential demodulation, but makes it necessary for the carrier recovery device to be capable of giving a good estimate of the frequency response of the channel at any instant.

There is a method, known from the patent application No. FR 90 01491 dated Feb. 6, 1990 (corresponding to the U.S. Convention patent application U.S. Ser. No. 07/648,899 filed on Jan. 31, 1991) for broadcasting with time-frequency interlacing: this method enables coherent demodulation in providing for the insertion, among the useful information elements to be transmitted, of reference elements of the value and position, known to the receivers, in the frequency-time f-t space.

The basic idea of this method therefore consists in using certain carriers, judiciously distributed in the time-frequency domain, as phase and/or amplitude reference pilot frequencies. That is to say, fixed words, acting as amplitude and/or phase references at reception are inserted, at predetermined locations, among the data elements to be transmitted.

Thus it is possible, by interpolation, to determine a phase and amplitude reference for each of the digital elements, and hence to carry out a coherent demodulation.

More precisely, the estimation of the response of the channel is obtained by an interpolation filtration, either by circular convolution, as described in the already mentioned French patent application No. 90 01491 or by Fourier transform. The advantage of this latter approach is that, for equal quality, it needs a smaller number of operations than the former one.

However, it is seen that these methods do not provide satisfactory results in practice. Indeed, while the gain for the coherent demodulation as compared 7ith the differential demodulation is theoretically 3 dB when the response of the channel is perfectly estimated, in practice it is only 0.5 dB.

This poor result is due essentially to the fact that the estimation of the response of the channel is highly noise-infested, thus adversely affecting the quality of the interpolation.

The invention is designed notably to overcome this drawback of the prior art.

SUMMARY OF THE INVENTION

More precisely, an aim of the invention is to provide a device for the coherent demodulation of a digital signal interlaced in time and in frequency, having a substantial gain, of the order of 2 dB, as compared with differential demodulation.

It is an aim of the invention, therefore, to provide a device such as this wherein the influence of the noise is reduced and, hence, the results of the interpolation are improved.

A particular aim of the invention is to provide a device such as this, requiring only a simple and inexpensive matching of the known decoders, and using computation means and information elements already present in these decoders.

Another aim of the invention is to provide a device such as this, requiring no matching of the signal to be transmitted.

In a complementary way, the invention also proposes a broadcasting method which, without any addition of supplementary references, enables higher quality interpolation at reception.

The device and the method of the invention can advantageously be implemented in conjunction. However they are independent, and each of them can be used without the other.

These aims, as well as others that shall appear here below, are achieved, according to the invention, by means of a device for the coherent demodulation of a digital signal of the type constituted by digital elements distributed in the time-frequency space and transmitted in the form of symbols constituted by a multiplex of N orthogonal carrier frequencies modulated by a set of said digital elements and broadcast simultaneously, said digital signal comprising reference elements, having a value and a position, in said time-frequency space, that are known to said demodulation device, the device including means for the estimation, by Fourier transform, of the frequency response of the transmission channel at any instant, carrying out the transformation of the received samples, corresponding to reference elements, from the frequency domain to the temporal domain, the multiplication in the temporal domain of said transformed samples by a rectangular temporal 7indow ($f_n$) and the reverse transformation, after said multiplication, of the obtained samples from the temporal domain into the frequency domain, said estimation means including thresholding or threshold-setting means for said samples in said temporal field, providing for the systematic elimination of the samples below a certain threshold.

In this way, the reference elements received with low power, hence the elements most disturbed by the noise, are not taken into account.

Advantageously, for the computation of said threshold, said thresholding means take account of the value $\sigma^2$ of the power level of the noise affecting said transmission channel.

In a preferred embodiment, said threshold has a value ranging from 5 $\sigma$ to 6 $\sigma$.

Advantageously, for the computation of said threshold, said thresholding means also take account of an estimation of the pulse response of said transmission channel.

In a simplified embodiment of the invention, the threshold may be fixed.

Preferably, said thresholding means are placed upline from said windowing means. However, these means may also be placed downline.

Advantageously, said transformation of the received samples is a transformation with a format equal to the number M of reference elements per symbol transmitted, and said multiplication by a temporal window simply achieves the addition of a series of (N-M) zeros to the M transformed reference elements.

The invention also relates to a method for the coherent demodulation of a digital signal of the type constituted by digital elements distributed in the time-frequency space, comprising a step of estimation, by Fourier transform, of the frequency response of the transmission channel at any instant, comprising the steps of:

the transformation of the received samples corresponding to reference elements from the frequency domain into the temporal domain;

the multiplication, in the temporal domain, of said transformed samples by a rectangular temporal window ($f_n$), the reverse transformation, after said multiplication, of the obtained samples from the temporal domain into the frequency domain, and further comprising a step for thresholding said samples in said temporal domain, providing for the systematic elimination of samples below a certain threshold.

In a complementary way, the invention presents a method for the broadcasting of a digital signal of the type constituted by digital elements distributed in the time-frequency space and transmitted in the form of symbols constituted by a multiplex of N orthogonal carrier frequencies modulated by a set of said digital elements and broadcast simultaneously, said digital signal comprising reference elements, with a value and position, in said time-frequency space, that are known to said demodulation device, said method comprising means for the transmission of said carriers, selectively assigning, to the carriers that bear reference elements, a power level greater than that used for the carrier elements that bear useful information elements.

Indeed, an aim of the invention is to facilitate the distinction of the reference elements with reference to the noise induced by the transmission channel. This may therefore be done at reception, by threshold-setting, but also at transmission, by increasing the power of the reference elements. It will then naturally be easier to distinguish them at reception.

These two means are clearly independent. However, they can advantageously be implemented simultaneously.

BRIEF DESCRIPTION OF THE DRAWINGS

Other features and advantages of the invention shall appear from the following description of a preferred embodiment of the invention, given by way of an illustrative and non-restrictive example, and from the appended drawings of which.

DETAILED DESCRIPTION OF THE INVENTION

The different aspects of the embodiment that shall be described here below more particularly relate to the reception of digital sound broadcasting towards mobile receivers.

However it is clear that the principle of the device, according to the invention, for the coherent demodulation of digital signals at high bit rate, can be applied to all types of receivers, provided that the data elements are broadcast in the form of time-frequency interlaced digital data and that the data elements include reference elements.

This device can be applied notably but not exclusively to the reception of signals transmitted according to the method described in the patent application No. FR 90 01491 (corresponding to the US Convention patent application U.S. Ser. No. 07/648,899 filed on Jan. 31, 1991).

In the application of digital sound broadcasting, one aim may be, for example, the transmission of sixteen stereophonic programs in a frequency band with a width of 8 MHz, with a bit rate of the order of 250 kbits after compression per stereophonic program.

This is notably the case of the COFDM broadcasting method. According to this method, the signal transmitted is constituted by a sequence of modulation symbols forming a multiplex of N orthogonal carriers. The number N of carriers can be chosen in a very large range from some unities (e.g. N=8) to some thousands (e.g. N=2048).

Let $\{f_k\}$ be the set of carrier frequencies considered, with:

$$f_k = k/t_s, \quad k = 0 \text{ to } N-1$$

The base of elementary signals $\Psi_{j,k}(t)$ (with k=0 to N−1, j=−∞ to +∞) can then be defined:

$$\Psi_{j,k}(t) = g_k(t - jT_s)$$

with:

$$0 \leq t \leq T_s; g_k(t) = e^{2i\pi f_k t}$$

otherwise:

$$g_k(t) = 0$$

Furthermore, let us take a set of complex numbers $\{C_{j,k}\}$ taking its values in a finite alphabet, representing the transmitted data signal.

The associated OFDM signal can then be written as follows:

$$x(t) = Re\left[ e^{2i\pi f_0 t} \left( \sum_{j=-\infty}^{+\infty} \sum_{k=0}^{N-1} C_{j,k} \Psi_{j,k}(t) \right) \right]$$

To resolve every problem of frequency selectivity of the channel, a guard interval with a duration $\Delta$ (e.g. $\Delta = t_s/4$) is inserted before each signal $\Psi_{j,k}(t)$, in order to absorb inter-symbol jamming.

$t_s$ henceforth represents the duration of the useful signal $T_s = t_s + \Delta$ represents the duration of the signal and $\Delta$ represents the duration of the guard interval.

The transmitted signals are then defined by the relationship:

$$\Psi_{j,k}(t) = g_k(t - jT_s)$$

with:

$$-\Delta \leq t \leq t_s; g_k(t) = e^{2i\pi f_k t}$$

otherwise:

$$g_k(t) = 0$$

The channel is modelled by the relationship:

$$Y_{j,k} = H_{j,k} \cdot C_{j,k} + N_{j,k}$$

where:

$H_{j,k}$ is the response of the channel at the frequency $f_k$ and the instant $jT_s$ $N_{j,k}$ is a complex Gaussian noise $Y_{j,k}$ is the symbol obtained after projection of the COFDM signal received on each carrier k and at each instant j.

To enable a coherent demodulation, the carrier recovery device used in coherent demodulation should be capable of providing an estimation of the response of the channel:

$$H_{j,k} = \rho_{j,k} \cdot e^{i\phi_{j,k}}$$

for all the instants j and all the frequencies k.

where:

$\rho_{j,k}$ is the amplitude of the response of the channel, $\phi_{j,k}$ is the phase of the response of the channel.

An advantageous way of implementing it consists in using certain carriers carefully and equally distributed in the time-frequency domain as phase and/or amplitude reference pilot frequencies. This is quite possible with the COFDM system owing to the two-dimensional nature of the transmitted signal.

This makes it possible to obtain an estimation of the values of $H_{j,k}$ for certain instants and certain frequencies corresponding to the insertion of these references.

The estimation of the response of the channel $H_{j,k}$ at any instant $jT_s$ and for all the frequencies $f_k$ is then obtained by interpolation filtration.

This digital filtering can be done in a standard way by a product of convolution of the input signal and of the pulse response of the filter. Each output value is then replaced by the weighted sum of its neighbors.

There is another advantageous way of carrying out this filtering operation, which uses the property according to which Fourier transform of a product of convolution is equal to the product of the transforms. The operation then necessitates a direct (respectively reverse) Fourier transform (DFT), a windowing (weighting) of the signal to be interpolated and a reverse (respectively direct) DFT.

The invention relates more particularly to this second method. Indeed, one of the valuable properties of the DFT is that the transform of a convolution product is equal to the product of the transforms. It can therefore be seen that the number of operations to be performed by this method is smaller than that necessary for the finite pulse response filtering, for an equivalent output.

Besides, it dicates only little modification of the decoders, since means for the computation of a DFT are already present.

The insertion of the reference carriers, at a rate of one reference for every R carriers (advantageously, R is a power of 2. For instance, R is chosen in the range [4, 64]), enables the receiver to have a noise-infested estimation of the sub-sampled frequency response of the channel represented by:

$$\tilde{H}(\nu) \text{ for } \nu = n.R \quad n:0 \ldots (N-1)/R$$

with $R-1$: number of carriers between two references.

It is therefore necessary to determine the following convolution product 7hich corresponds to the output signal of the filtering of $H(\nu)$ by a finite pulse response filter:

$$\hat{H}(k) = \sum_{\nu=0}^{N-1} H'(\nu) \cdot F(k-\nu) \quad (1)$$

with $$H'(\nu) = H(\nu)$$

if $\nu = n.R$ $$H'(\nu) = 0$$

if not
and
$F(k-\nu)$: coefficients of the low-pass filter of interpolation.

The N estimated sample $\hat{H}(k)$ are obtained by a weighted sum of the neighbouring samples $H(\nu)$.

Given the sequences of N elementsq $H'(\nu)$ (response of the channel in the frequency domain) and $F(\nu)$ (response of the filter in the frequency domain) elements, the reverse Fourier transforms of which are respectively $h'(n)$ and $f(n)$, the transform of the circular convolution (1) can be written:

$$\hat{h} = h'(n).f(n)$$

with
$\hat{h}(n)$ $DFT^{-1}$ on N elements of $\hat{H}(k)$
$h'(n)$ $DFT^{-1}$ on N elements of $H'(k)$
$f(n)$ $DFT^{-1}$ on N elements of $F(k)$.

This method of interpolation will then necessitate the following three successive operations:
  Reverse DFT to obtain the $h'(n)$ and $f(n)$ values from the $H'(k)$ and $F(k)$ values (passage from the frequency domain to the temporal domain);
  Product of $h'(n)$ by $f(n)$;
  Direct DFT to obtain the $\hat{H}(k)$ from the $\hat{h}(n)$ (passage from the temporal field to the frequency field).

It is desirable to choose a power of 2 for N in order to carry out the DFT operations easily (for instance, $N=512$).

Figure 1:
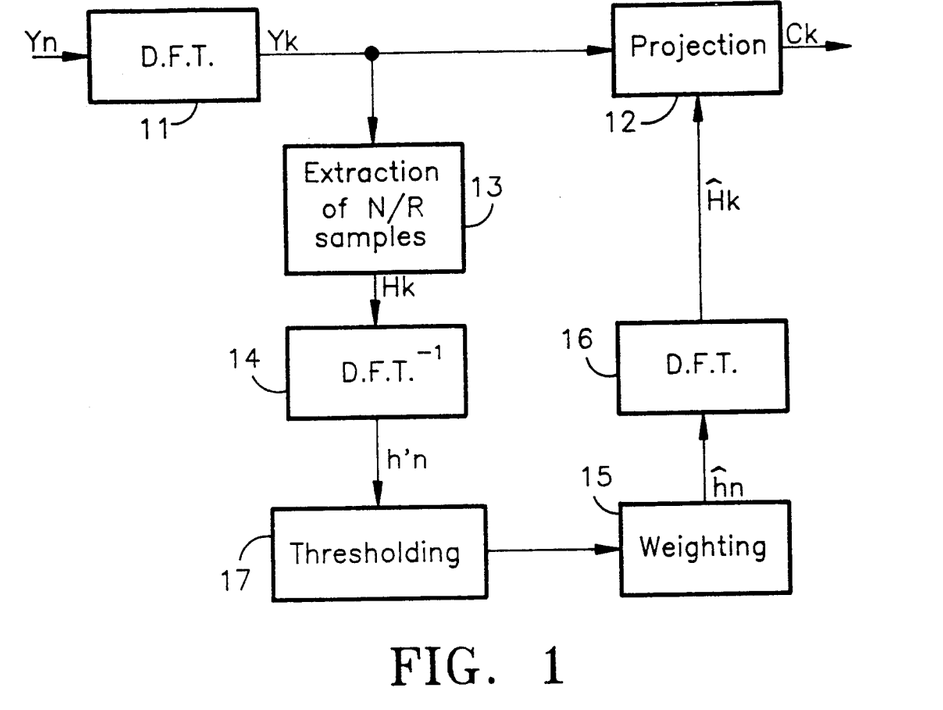
FIG. 1 shows a block diagram of the thresholding means of a coherent demodulation device according to the invention, implementing a Fourier transform and a samples thresholding operation.

FIG. 1 shows a diagram of a demodulation device implementing means such as these for estimating the response of the channel.

The sampled signal $y_n$ received is demodulated in a standard way, by a discrete Fourier transform (DFT) 11 producing the following samples in the frequency domain: $Y_k = H_k \cdot C_k + N_k$, with k varying from 0 to $N-1$.

The definitive samples $\hat{C}_k$ are obtained by projection, in a module 12, of the values $Y_k$ on the estimations $\hat{H}_k$ of the frequency response of the channel.

The interpolation of this frequency response is obtained as follows. A module 13 carries out the extraction of the $M = N/R$ samples $\tilde{H}_k (\tilde{H}_0, \tilde{H}_r, \tilde{H}_{2r}, \ldots \tilde{H}_{n-r})$ corresponding to the reference elements of all the samples $Y_k$, and the insertion of $(N-N/R)$ zero fictitious elements between these references, so as to obtain N elements according to the following sequence $\tilde{H}_0, 0, \ldots, 0, \tilde{H}_r, 0, \ldots, 0, \tilde{H}_{n-r}$.

A reverse transformation 14 with N elements is used to obtain the temporal domain of the values $h'_n$ corresponding to the interpolation in the temporal domain of the sub-sampling $\tilde{H}_k$ of the frequency response of the channel. More precisely, the sequence of the N values of $h'_n$ obtained after the $DFT^{-1}$ 14 constitutes an estimation of the pulse response of the channel.

If $h(n)$ is used to designate the reverse transform computed on N elements of $H(k)$, it is shown that, in not taking the noise into account, $h'(n)$ /btained from the reverse DFT of $H'(k)$ can be expressed as follows:

$$h'(n) = h(n) + h(n+N/R) + h(n+(2N/R)) + \ldots \\ h(n+(R-1)N/R)$$

where the indices are taken modulo N.

Figure 2A:
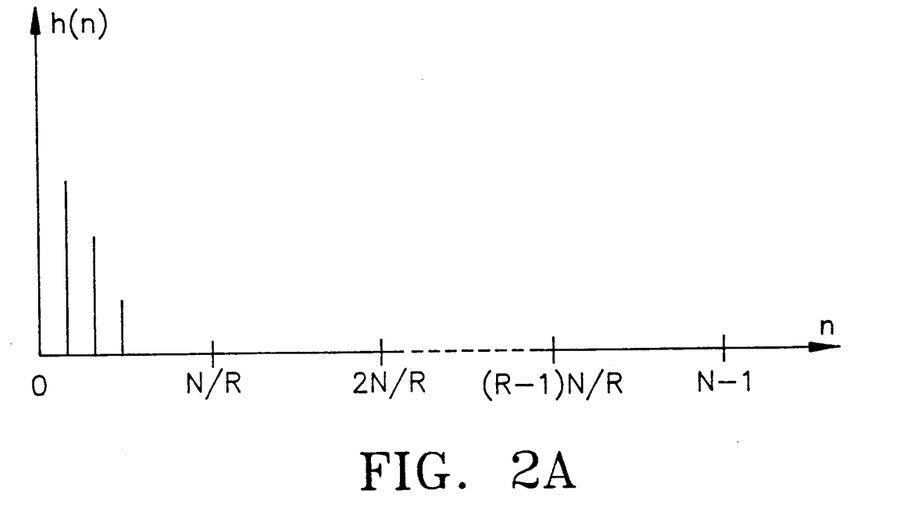
FIGS. 2A and 2B respectively show two examples of theoretical estimations of the pulse response of the channel when it is assumed that all the carriers are reference carriers, and in the case of the insertion of one carrier reference for every R carriers.
Figure 2B:
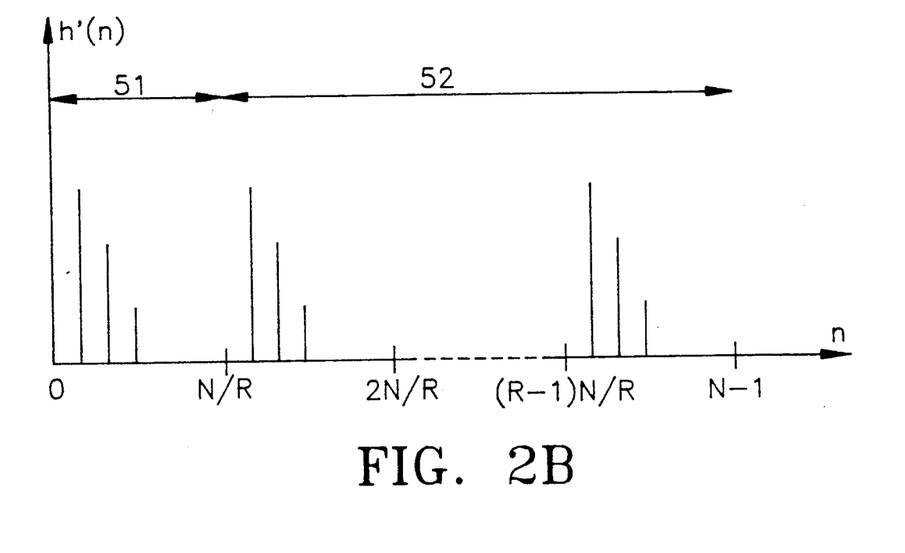

FIGS. 2A and 2B respectively show two examples of estimations of the pulse response of the channel $h(n)$ (corresponding to the assumption where all the carriers are reference carriers), and $h'(n)$ (corresponding to a sub-sampling of the frequency response of the channel, i.e. to the use of one reference carrier for every R carriers).

It can be clearly seen in FIG. 2B that the insertion of zero fictitious elements between the reference elements entails a repetition of the pulse response. So as to obtain an estimation 51 corresponding to that of FIG. 2A, and hence eliminate the part 52, it is necessary to carry out a temporal windowing operation.

It is shown that the estimation $h'(n)$ of the pulse response of the channel shows no overlapping, if and only if the spread $\Delta\tau_{max}$ of the different echos verifies:

$$\Delta\tau_{max} \leq NT/R = t_s/R$$

(T: sampling period)

This corresponds to the usual Shannon criterion for the sampling of a signal, applied herein to the specific case of a complex signal, the Fourier Transform of which is dissymmetrical.

It is therefore necessary to apply a weighting window $f(n)$ 15 defined by:

$$f(n) = 1 \text{ for } n: 0, \ldots, (N/R - 1)$$

$$f(n) = 0 \text{ for } n: N/R, \ldots, N-1$$

The N samples given by the window 15 are then transformed by a discrete Fourier transform 16 with N points giving the estimation $\hat{H}_k$ of the response of the channel in the frequency domain.

In another embodiment, it is possible not to insert zero samples among the samples $\tilde{H}_k$ extracted by the extraction module 13.

In this case, the module 14 carries out a reverse Fourier transform only on N/R points. This second approach has the advantage of calling for a smaller number of operations.

Furthermore, in this case, the windowing 15 corresponds to a simple addition, to the N/R terms h'$_n$, of a series of N−N/R zero samples. The application to the signal h'$_n$ of a rectangular temporal window followed by the DFT may be interpreted as the perfect sampling of the signal (if the Shannon conditions are met) in the frequency domain. By thus increasing the duration of the recording, in taking it from N/R to N with zero complementary samples, a finer spectral analysis is obtained.

Depending on the embodiment, it is possible to choose to limit the number of operations by adopting this second method or to emphasize the use of a standard DFT format, in implementing the first method presented.

Finally it is clear that the order of the DFT$^{-1}$ and DFT transformations can be reversed. It is quite possible for the module 14 to carry out a direct transformation and for the module 16 to carry out a reverse transformation.

Figure 3:
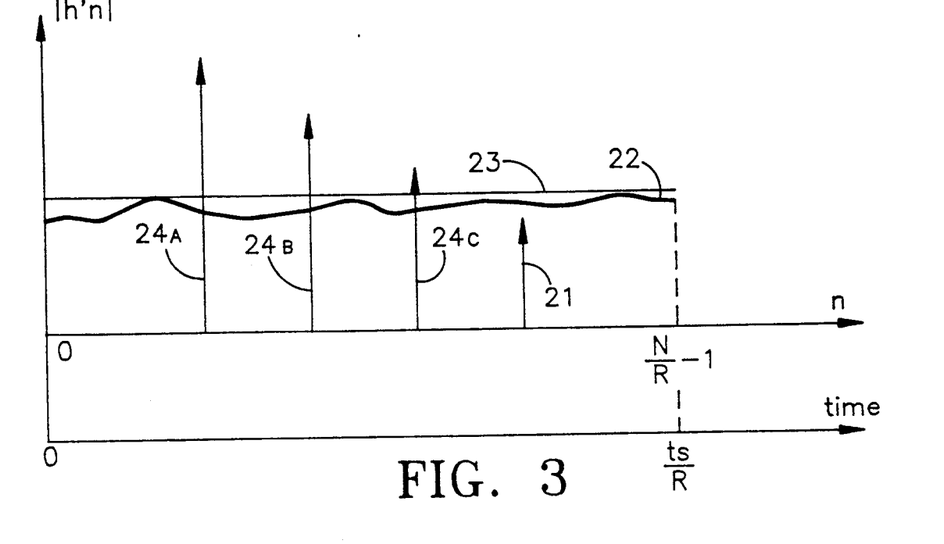
FIG. 3 illustrates an example of estimation of the pulse response of the channel obtained in practice, in the case of a device that does not implement the thresholding means of the invention.

FIG. 3 is an example of estimation of the pulse response of the channel, as obtained in practice. We thus obtain a table of N/R complex values that can be graduated in delay. This table has M distinct lines to which there is added a centered Gaussian complex noise.

This estimation of the response of the channel is therefore highly noise-infested, and this lowers the quality of the interpolation.

Thus, while the gain for the coherent demodulation in relation to the theoretical demodulation is theoretically 3 dB when the response of the channel is estimated perfectly, it is in the range of only 0.5 dB in practice.

According to an essential characteristic of the invention, the pulse response of the channel is processed so as to limit the influence of the noise. There is thus provided a module 17 to threshold this response: this module provides for the systematic elimination of every sample below a certain threshold. As specified here below, this threshold may be fixed or adaptive.

Indeed, it is clear that any line 21 below the noise level 22 is wholly unexploitable. The invention therefore proposes the placing of a threshold 23 on this signal, eliminating any signal whose modulus is below this threshold, and especially the noise 22, and therefore keeping only the useful lines 24$_A$, 24$_B$, 24$_C$.

Figure 6:
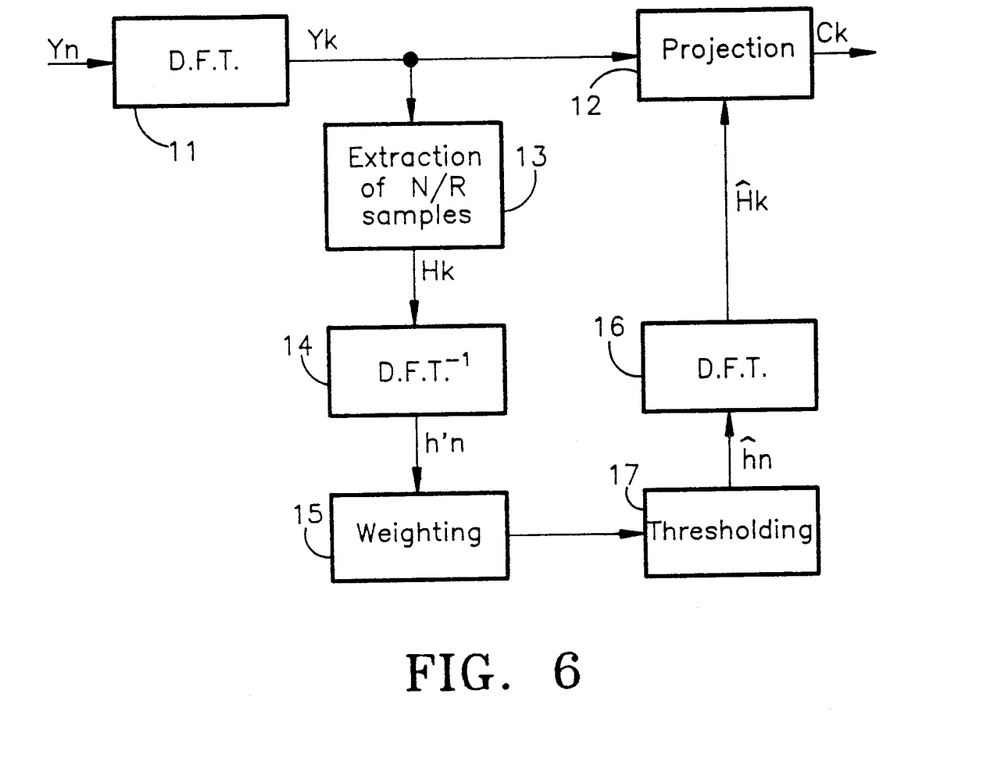
FIG. 6 shows a block diagram of an alternate demodulation device according to the invention.

The thresholding is advantageously done before the windowing operation, notably in the case of the second approach described. Indeed, there are then fewer samples to be processed. However, it may also be done between the operations of windowing and direct transformation as shown in the block diagram of FIG. 6

This method performs especially well with signals of the COFDM type. Indeed, the useful information is distributed over a relatively reduced number of lines. A high proportion of it is therefore above the threshold and is kept. By contrast, the essential part of the noise is eliminated.

Advantageously, a variable threshold is chosen, notably as a function of the noise level.

Figure 4:
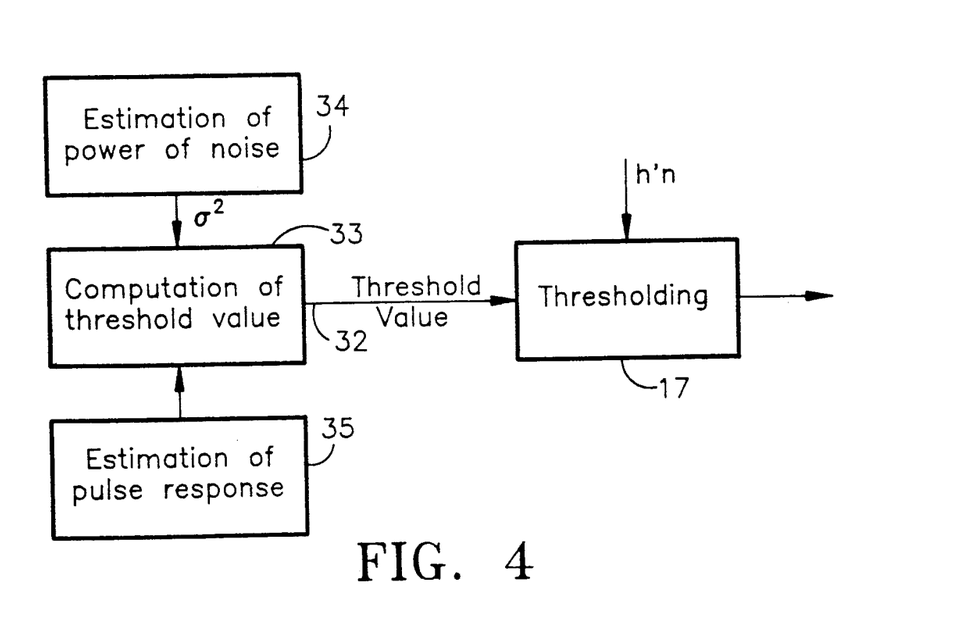
FIG. 4 is the block diagram of the threshold-setting means of a device such as is shown in FIG. 1, in a case where the threshold depends on the noise level and on the pulse response of the transmission channel.

FIG. 4 shows a block diagram of threshold-setting means such as these, according to a preferred embodiment of the invention.

The threshold-setting operation 17 is therefore done on the samples h'$_n$, as a function of a variable threshold 32. A computation module 33 determines the value of the threshold, taking account of the estimation $\sigma^2$ of the power of the noise given by an estimation module 34.

It must be noted that, in the COFDM decoders, this information $\sigma^2$ is already available. The device of the invention therefore does not call for any major processing means but, on the contrary, exploits the means and information elements present in each decoder, whether it is for the computation of the DFT or for the estimation of $\sigma^2$.

This estimation can be obtained, for example, according to the method described in U.S. Pat. No. 5,191,576 in which advantage is taken of the absence of a signal during a symbol period to carry out a spectral analysis of the noise.

It has been observed that, in the examples of implementation presented further below, the optimum threshold is between 5$\sigma$ and 6$\sigma$, $\sigma$ being the standard deviation of the noise.

The threshold-computing module 33 can also take account of an estimation of the pulse response of the channel, and especially of the number of significant lines. Indeed, the more lines there are, the greater is the distribution of the power. This information element is given by a module 35 for the estimation of the pulse response. Again, the module 35 is already present in the COFDM decoders and is used for the synchronization.

The thresholding module 17 may, for example, be a comparator or a biasing circuit.

Many other configurations can naturally be implemented. Thus, it is possible to add a decision module to the means described, in implementing the thresholding operation only if the threshold goes beyond a certain reference value.

It is also possible to chose a fixed, non-adaptive threshold which may then be equal to about 5 times a "critical $\sigma$" namely $\sigma_s$. In this case, $\sigma_s$ may, for example, characterize a noise power level corresponding to a BER (binary error rate) of about 10$^{-4}$.

Here below, we present some numerical results obtained with a device according to the invention, with reference to FIG. 5.

In this example, the COFDM modulation technique is used. The number of carriers N of the multiplex is 512. Each symbol with a length T$_s$=80 µs has a useful duration t$_s$=64 µs. Each carrier is phase-modulated with four states.

It is known that if one reference is used for every R carriers, the information on the response of the channel will be preserved so long as $\Delta\tau_{max} < t_s/R$ where $\Delta\tau_{max}$ is the maximum spread of the pulse response of the channel.

This pulse response may be modelled by an exponential distribution having the form:

$$P(\tau) = \frac{1}{\tau_0} e^{-\tau/\tau_\theta} \text{ for } \tau \geq 0$$

with $\tau_0$: mean and standard deviation of the delays

Figure 5:
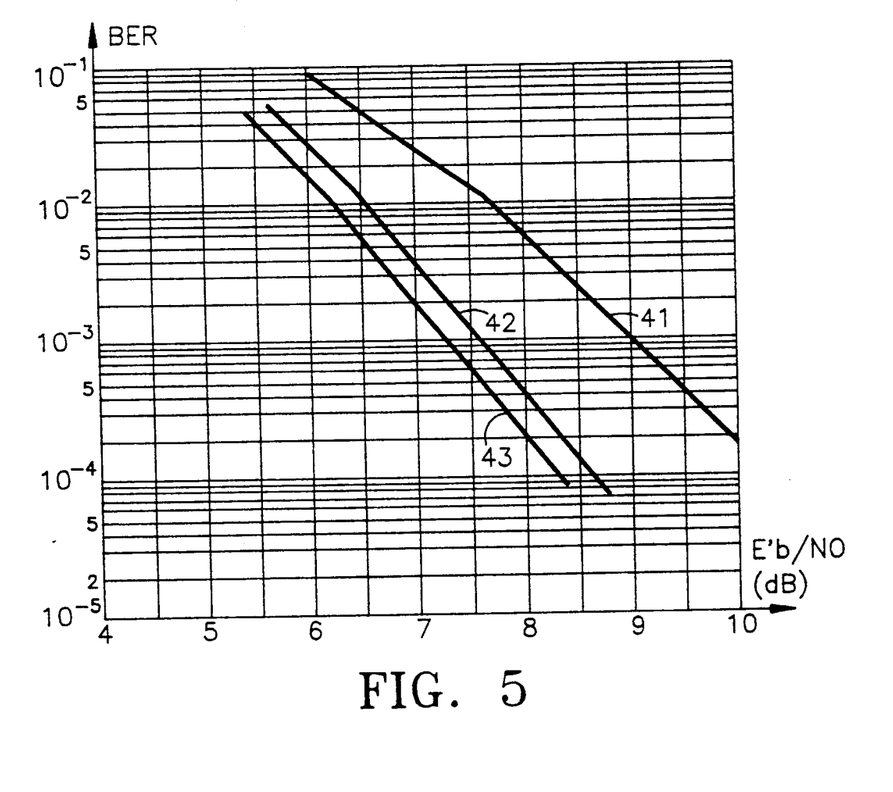
FIG. 5 shows a comparison of the results obtained in the case of a differential demodulation and in the case of coherent demodulations with one reference element for four carriers and one reference element for eight carriers.

FIG. 5 compares three types of demodulation:
differential demodulation 41;
coherent demodulation with one reference for 4 carriers 42;
coherent demodulation with one reference for 8 carriers 43;
for a standard deviation of the delays $\tau_0$ equal to 1 µs.

These curves take account of the loss in power efficiency (10 log 1/R) due to the insertion of the carriers (curve parametrized in Energy per useful bit on N$_0$).

It is therefore seen that, through the device of the invention, there is obtained a gain ranging from 1.6 dB (for R=4) to 2 dB (for R=8) as compared with the differential demodulation.

In other words, the processing of the noise of the estimation of the pulse response of the channel before interpolation makes it possible to achieve a result /f about 1 dB in relation to the curve that would be obtained in coherent demodulation with a perfect estimation of the channel.

It is clear that the device of the invention is even more promising when the number of constellation states of each carrier increases.

Besides the invention proposes an improved method of broadcasting, also making it possible to facilitate coherent demodulation. For, we have seen the need to clearly distinguish the reference elements from the noise.

Figure 7:
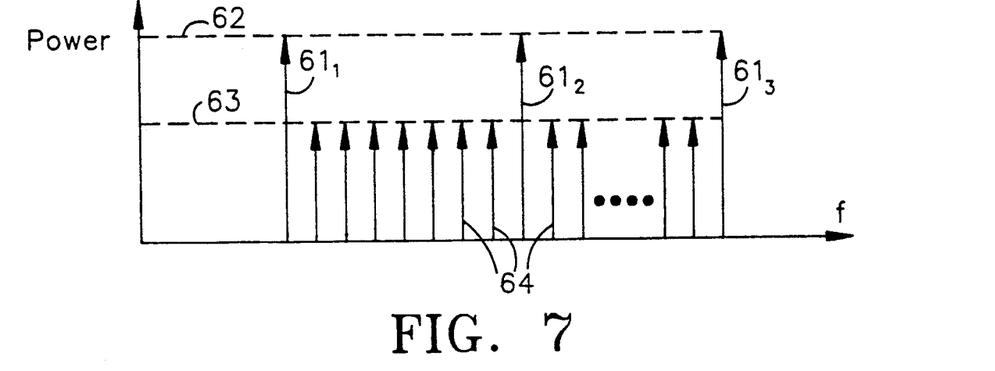
FIG. 7 illustrates an example of a signal to be transmitted according to one embodiment of the invention.

Another approach used to obtain this result is to make an increase, at transmission, in the power of the reference carriers in relation to the carriers conveying information. FIG. 7 illustrates the corresponding signal to be transmitted. The reference carriers $61_1$ to $61_3$ have a power level 62 which is greater than the power level 63 of the other carriers 64. Since the number of reference carriers M=N/R is relatively smaller than the total number N, the incident diminishing of the power efficiency of the system is thus minimal.

For example, these reference carriers $61_1$ to $61_3$ may have power level of 1.2 to 2 times the power associated with the other carriers 64.

Figure 8:
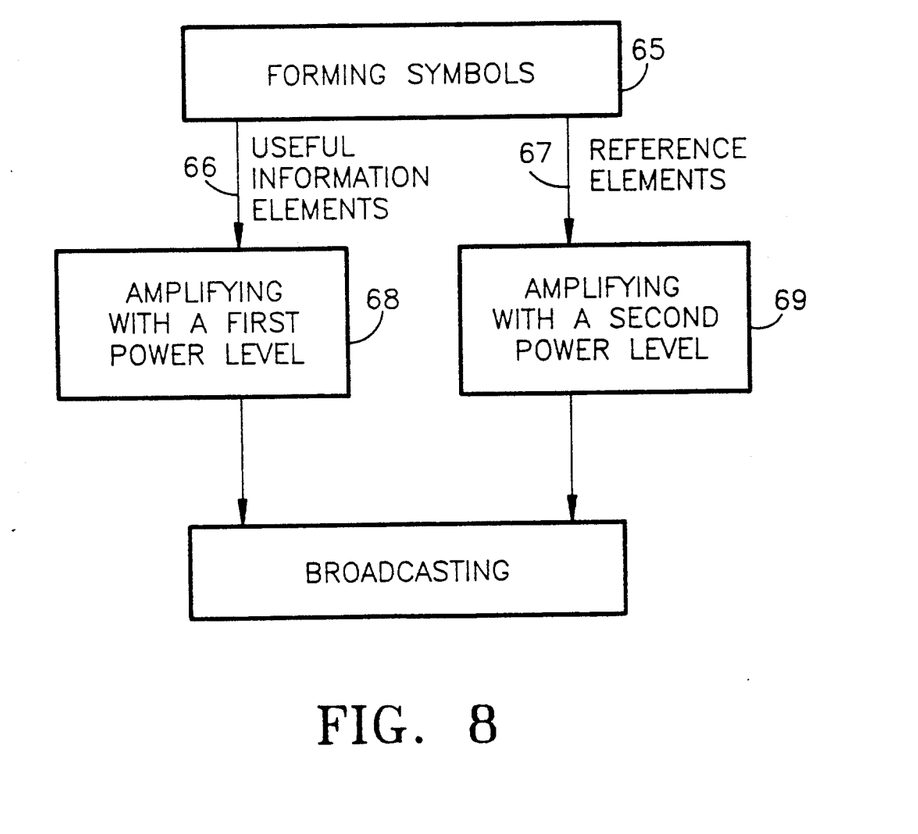
FIG. 8 shows a block diagram of a transmitter of a signal as shown in FIG. 7.

FIG. 8 presents the method for making such a signal. It comprises a step 65 of forming symbols, consisting in grouping N data elements, as previously discussed. These data elements are split into two groups: the useful information elements 66 and the reference elements 67. The elements 66 of the first group are amplified 68 with a first power level. The elements 67 of the second group are amplified 69 with a second power level, greater than the first power level.

Naturally, the broadcasting method and the demodulation device of the invention can be implemented simultaneously, to further improve the quality of demodulation. They can also be used independently.

What is claimed is:

1. A method for broadcasting a digital signal constituted by digital elements that bear useful information distributed in the time-frequency space and transmitted in the form of symbols constituted by a multiplex of N orthogonal carrier frequencies modulated by a set of said digital elements and broadcast simultaneously, said digital signal further comprising reference elements with a known value and position in said time-frequency space, wherein said method additionally comprises a step of selectively assigning, to the carriers that bear said reference elements, a power level greater than that used for the carrier elements that bear the useful information elements.

2. A transmitter of a digital signal, implementing the broadcasting method of claim 1.

3. In a device for the coherent demodulation of a digital signal $y_n$ constituted by digital elements distributed in the time-frequency space and transmitted in the form of successive symbols, each symbol being constituted by a multiplex of N orthogonal carrier frequencies, each carrier frequency being modulated by a set of said digital elements and broadcast simultaneously in a transmission channel, said digital signal further comprising reference elements having a value and a position in said time-frequency space that are known to said demodulation device, said reference elements modulating reference carrier frequencies selected among said multiplex of N orthogonal carrier frequencies at a rate of one reference element for every R carrier frequencies, the demodulation device comprising:

a first transform means for carrying out a Fourier transform on the digital signal $y_n$ to produce a series of N frequency samples $Y_k$ corresponding to said multiplex of N orthogonal frequency carriers, extraction means coupled to the first transform means for extracting from said series of N frequency samples $Y_k$ N/R reference samples $H_k$ corresponding to a set of said reference elements and inserting (N−N/R) zero fictitious samples between said reference samples $H_k$, so as to form a reference symbol comprising N samples, a second transform means coupled to the extraction means for computing a Fourier transform of said reference symbol to provide a series of N temporal values $h'_n$ corresponding to an estimation of the pulse response of the transmission channel, threshold means coupled to the second transform means &or systematically cancelling from said series of N temporal values $h'_n$ the values which are below a predetermined threshold to provide a series of N threshold temporal values, weighting means coupled to the threshold means for weighting said series of N threshold temporal values by carrying out a multiplication by 1 of the first N/R thresholded temporal samples and a multiplication by 0 of the remaining thresholded temporal values to provide a series of N weighted temporal values $\hat{h}_n$, third transform means coupled to the weighting means for computing a Fourier transform, reverse from that computed by said second Fourier transform means, of said series of N weighted temporal values $\hat{h}_n$ to provide a series of N elements forming an estimation $\hat{H}_k$ of the frequency response of the transmission channel, and projecting means coupled to the first transform means and to the third transform means for projecting said series of N frequency samples $Y_k$ on said estimation $\hat{H}_k$ of the frequency response of the transmission channel to provide N decoded samples $\hat{C}_k$ corresponding to said digital elements.

4. In a device for the coherent demodulation of a digital signal $y_n$ constituted by digital elements distributed in the time-frequency space and transmitted in the form of successive symbols, each symbol being constituted by a multiplex of N orthogonal carrier frequencies, each carrier frequency being modulated by a set of said digital elements and broadcast simultaneously in a transmission channel, said digital signal further comprising reference elements having a value and a position in said time-frequency space that are known to said demodulation device, said reference elements modulating reference carrier frequencies selected among said multiplex of N orthogonal carrier frequencies at a rate of one reference element for every R carrier frequencies, the demodulation device comprising:

a first transform means for carrying out a Fourier transform on the digital signal $y_n$ to produce a series of N frequency samples $Y_k$ corresponding to said multiplex of N orthogonal frequency carriers, extraction means coupled to the first transform means for extracting from said series of N frequency samples $Y_k$ N/R reference samples $H_k$ corresponding to a set of said reference elements and inserting (N−N/R) zero fictitious samples between said reference samples $H_k$, so as to form a reference symbol comprising N samples, a second transform means coupled to the extraction means for computing a Fourier transform of said reference symbol to provide a series of N temporal values $h'_n$ corresponding to an estimation of the pulse response of the transmission channel, weighting means coupled to the second transform means for weighting said series of N temporal values $h'_n$ by carrying out a multiplication by 1 of the first N/R temporal values and a multiplication by 0 of the remaining temporal values to provide a series of N weighted temporal values $\hat{h}_n$, threshold means coupled to the weighting means for systematically cancelling from said series of N temporal values $h_n$ the values which are below a predetermined threshold to provide a series of N thresholded temporal values, third transform means coupled to the threshold means for computing a Fourier transform, reverse from that computed by said second Fourier transform means, of said series of N thresholded temporal values to provide a series of N elements forming an estimation $\hat{H}_k$ of the frequency response of the transmission channel, and projecting means coupled to the first transform means and to the third transform means for projecting said series of N frequency samples $Y_k$ on said estimation $\hat{H}_k$ of the frequency response of the transmission channel to provide N decoded samples $\hat{C}_k$ corresponding to said digital elements.

5. In a device for the coherent demodulation of a digital signal $y_n$ constituted by digital elements distributed in the time-frequency space and transmitted in the form of successive symbols, each symbol being constituted by a multiplex of N orthogonal carrier frequencies, each carrier frequency being modulated by a set of said digital elements and broadcast simultaneously in a transmission channel, said digital signal further comprising reference elements having a value and a position in said time-frequency space that are known to said demodulation device, said reference elements modulating reference carrier frequencies selected among said multiplex of N orthogonal carrier frequencies at a rate of one reference element for every R carrier frequencies, the demodulation device comprising:

a first transform means for carrying out a Fourier transform on the digital signal $y_n$ to produce a series of N frequency samples $Y_k$ corresponding to said multiplex of N orthogonal frequency carriers, extraction means coupled to the first transform means for extracting from said series of N frequency samples $Y_k$ N/R reference samples $H_k$ corresponding to said reference elements, a second transform means coupled to the extraction means for computing a Fourier transform of said N/R reference samples $H_k$ to provide a series of N/R temporal values $h'_n$ corresponding to an estimation of the pulse response of the transmission channel, threshold means coupled to the second transform means for systematically cancelling from said series of N temporal values $h'_n$ the values which are below a predetermined threshold to provide a series of N thresholded temporal values, weighting means coupled to the threshold means for weighting said series of N thresholded temporal values by carrying out a multiplication by 1 of the first N/R thresholded temporal values and an addition of a series of (N−N/R) complementary zero values to provide a series of N weighted temporal values $\hat{h}_n$, a third transform means coupled to the weighting means for computing a Fourier transform, reverse from that computed by said second transform means, of said series of N weighted temporal values to provide a series of N elements forming an estimation $\hat{H}_k$ of the frequency response of the transmission channel, and projection means coupled to the first transform means and to the third transform means for projecting said series of N frequency samples $Y_k$ on said estimation $\hat{H}_k$ of the frequency response of the transmission channel to provide N decoded samples $\hat{C}_k$ corresponding to said digital elements.

6. In a device for the coherent demodulation of a digital signal $y_n$ constituted by digital elements distributed in the time-frequency space and transmitted in the form of successive symbols, each symbol being constituted by a multiplex of N orthogonal carrier frequencies, each carrier frequency being modulated by a set of said digital elements and broadcast simultaneously in a transmission channel, said digital signal further comprising reference elements having a value and a position in said time-frequency space that are known to said demodulation device, said reference elements modulating reference carrier frequencies selected among said multiplex of N orthogonal carrier frequencies at a rate of one reference element for every R carrier frequencies, the demodulation device comprising:

a first transform means for carrying out a Fourier transform on the digital signal $Y_n$ to produce a series of N frequency samples $Y_k$ corresponding to said multiplex of N orthogonal frequency carriers, extraction means coupled to the first transform means for extracting from said series of N frequency samples $Y_k$ N/R reference samples $H_k$ corresponding to said reference elements, a second transform means coupled to the extraction means for computing a Fourier transform of said N/R reference samples $H_k$ to provide a series of N/R temporal values $h'_n$ corresponding to an estimation of the pulse response of the transmission channel, weighting means coupled to the second transform means for weighting said series of N/R temporal values $h'_n$ by carrying out a multiplication by 1 of the temporal values and an addition of a series of (N−N/R) complementary zero values to provide a series of N weighted temporal values $\hat{h}_n$, threshold means coupled to the weighting means for systematically cancelling from said series of N weighted temporal values $h_n$ the values which are below a predetermined threshold to provide a series of N thresholded temporal values, a third transform means coupled to the threshold means for computing a Fourier transform, reverse from that computed by said second transform means, of said series of N thresholded temporal values to provide a series of N elements forming an estimation $\hat{H}_k$ of the frequency response of the transmission channel, and projection means coupled to the first transform means and to the third transform means for projecting said series of N frequency samples $Y_k$ on said estimation $\hat{H}_k$ of the frequency response of the transmission channel to provide N decoded samples $\hat{C}_k$ corresponding to said digital elements.

7. A device according to any of claims 3 to 6 further comprising supply means coupled to said threshold means for supplying said predetermined threshold.

8. A device according to claim 7 wherein said predetermined threshold is fixed.

9. A device according to claim 7 further comprising noise power means coupled to the supply means for determining a value $\rho^2$ of the power level of the noise affecting said transmission channel, the supply means using the value $\rho^2$ of the power level of the noise to set a value for said predetermined threshold.

10. A device according to claim 9 wherein the predetermined threshold is set at a value ranging from about $5\rho$ to $6\rho$.

11. A device according to claim 7 further comprising pulse response means coupled to the supply means for estimating the pulse response of said transmission channel, the supply means using the estimated pulse response to set a value for said predetermined threshold.

12. In a method for the coherent demodulation of a digital signal constituted by digital elements distributed in the time-frequency space and transmitted in the form of symbols constituted by a multiplex of N orthogonal carrier frequencies modulated by a set of said digital elements and broadcast simultaneously, said digital signal further comprising reference elements having a known value position in said time frequency space, a method for the estimation of the frequency response of the transmission channel at any instant comprising the steps of:

transforming at least samples of said digital signal containing said reference elements from a frequency domain into a temporal domain;

weighting the transformed samples in the temporal domain by a rectangular temporal window $f_n$, thresholding the transformed samples in the temporal domain to eliminate any samples below a predetermined threshold, and reverse transforming the samples remaining after said weighting and thresholding from the temporal domain into the frequency domain for projection onto said digital signal.

13. The method of claim 12 wherein said thresholding step is performed before said weighting step.

14. The method of either claims 12 or 13 further comprising the step of supplying a value for said predetermined threshold.

15. The method of claim 14 wherein the value of said predetermined threshold supplied comprises a fixed value.

16. The method of claim 14 further comprising the steps of determining a value $\rho^2$ of the power level of the noise affecting said transmission channel, and using the value $\rho^2$ of the power level of the noise to set a value for said predetermined threshold.

17. The method of claim 16 wherein the predetermined threshold is set at a value ranging from about $5\rho$ to $6\rho$.

18. The method of claim 14 further comprising the step of estimating the pulse response of said transmission channel, and using the estimated pulse response to set a value for said predetermined threshold.

* * * * *

UNITED STATES PATENT AND TRADEMARK OFFICE
CERTIFICATE OF CORRECTION

PATENT NO. : 5,307,376

DATED : April 26, 1994

INVENTOR(S) : M. Damien Castelain, et. al.

It is certified that error appears in the above-identified patent and that said Letters Patent is hereby corrected as shown below:

At column 12, line 25, please delete "&or" and insert therefor --for--;

At column 13, line 4, please delete "'a" and insert therefor --a--;

At column 13, line 20, please delete "₁of" and insert therefor --of--;

At column 15, line 16, please delete "p$^2$" and insert therefor --$\sigma^2$--;

At column 15, line 18, please delete "p$^2$" and insert therefor --$\sigma^2$--;

At column 15, line 22, please delete "5p to 6p" and insert therefor --5$\sigma$ to 6$\sigma$--;

At column 16, line 25, please delete "p$^2$" and insert therefor --$\sigma^2$--;

At column 16, line 27, please delete "p$^2$" and insert therefor --$\sigma^2$--;

UNITED STATES PATENT AND TRADEMARK OFFICE
CERTIFICATE OF CORRECTION

PATENT NO. : 5,307,376
DATED     : April 26, 1994
INVENTOR(S) : M. Damien Castelain, et. al.

It is certified that error appears in the above-identified patent and that said Letters Patent is hereby corrected as shown below:

At column 16, line 30, please delete "5p" and insert therefor --$5\sigma$--; and At column 16, line 31, please delete "6p" and insert therefor --$6\sigma$--.

Signed and Sealed this

Twenty-seventh Day of September, 1994

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,307,376
DATED : April 26, 1994
INVENTOR(S) : Castelain et al.

It is certified that error appears in the above-identified patent and that said Letters Patent is hereby corrected as shown below:

Title page,
Item [54], Title, please correct "CORRESPONSING" to read
-- CORRESPONDING --.

Signed and Sealed this

Twenty-ninth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 5,307,376
DATED         : April 26, 1994
INVENTOR(S)   : Castelain et al.

It is certified that error appears in the above-identified patent and that said Letters Patent is hereby corrected as shown below:

<u>Title page,</u>
Item [73], Assignee, add -- Telediffusion de France S.A., Montrouge Cedex, France --.

Signed and Sealed this

Sixth Day of September, 2005

JON W. DUDAS
*Director of the United States Patent and Trademark Office*